(12) United States Patent
Patterson

(10) Patent No.: US 6,607,217 B2
(45) Date of Patent: Aug. 19, 2003

(54) UNITARY MULTI-FLOW CONNECTION

(75) Inventor: Steven S. Patterson, Brentwood, TN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/025,858

(22) Filed: Dec. 26, 2001

(65) Prior Publication Data

US 2003/0116961 A1 Jun. 26, 2003

(51) Int. Cl.⁷ .............................................. F16L 39/00
(52) U.S. Cl. ................... 285/124.1; 285/124.2; 285/124.3
(58) Field of Search ................... 285/124.1, 124.2, 285/124.3, 124.4, 124.5

(56) References Cited

U.S. PATENT DOCUMENTS

| | | | | |
|---|---|---|---|---|
| 2,455,493 A | * | 12/1948 | Jacobs .................... | 285/124.1 |
| 3,214,195 A | * | 10/1965 | Zahuranec et al. ...... | 285/124.1 |
| 3,469,863 A | | 9/1969 | Riester et al. | |
| 3,523,700 A | * | 8/1970 | Palmer .................... | 285/124.4 |
| 4,076,279 A | * | 2/1978 | Klotz et al. .............. | 285/124.4 |
| 4,526,827 A | | 7/1985 | Stoll et al. | |
| 4,650,222 A | | 3/1987 | Cetrone | |
| 4,709,945 A | * | 12/1987 | Stoll ......................... | 285/12 |
| 4,740,018 A | * | 4/1988 | Kenmochi ................. | 249/85 |
| 4,893,845 A | * | 1/1990 | Bartholomew ........... | 285/120.1 |
| 4,900,065 A | | 2/1990 | Houck | |
| 5,282,488 A | * | 2/1994 | Roth et al. ................ | 137/15.08 |
| 5,622,392 A | * | 4/1997 | Gochenouer .............. | 285/124.1 |
| 5,988,703 A | * | 11/1999 | Craig ........................ | 219/93 |
| 6,003,904 A | | 12/1999 | Frohlich et al. | |
| 6,213,243 B1 | * | 4/2001 | Studebaker et al. ........ | 180/314 |

* cited by examiner

Primary Examiner—Lynne H. Browne
Assistant Examiner—James M. Hewitt
(74) Attorney, Agent, or Firm—Rader, Fishman & Grauer PLLC

(57) ABSTRACT

A fluid connection which may for example be used for connecting compressed air sources to pneumatic devices utilizes a plate with a first side and a second side. Unitary with the plate are a plurality of first fluid connections in the form of inlet ports extending from the first side of the plate and a plurality of second fluid connections in the form of outlet ports extending from the second side of the plate. There are more second fluid connections than first fluid connections, with single first fluid connections being connected to more than one second fluid connection.

9 Claims, 4 Drawing Sheets

UNITARY MULTI-FLOW CONNECTION

FIELD OF THE INVENTION

The present invention is directed to a unitary multi-flow connection. More particularly, the present invention is directed to a unitary multi-flow connection configured as a bulkhead union useful for transmitting fluids.

BACKGROUND OF THE INVENTION

Automotive vehicles currently utilize fluid pressure to activate various devices. Fluid pressure is provided by fluid pressure sources, usually driven by the engine of the vehicle, and is transmitted across panels or bulkheads separating compartments of the vehicle, such as a bulkhead or panel separating a passenger compartment of the vehicle from an engine compartment or an accessory control compartment from an engine compartment. Frequently there are situations in which there are numerous mechanical devices, some of which require the same pressure level for operation and others which require different pressure levels. In the past, this situation has been accommodated by a multi-piece bulkhead union in which one piece has a plurality of laterally extending channels which connect an inlet to one or more outlets. This is relatively expensive arrangement in which the two parts forming the union must be properly aligned and free of leakage in order for there to be proper functioning of the union. Accordingly, there is a need for a multi-part flow connection which is less expensive and more reliable.

SUMMARY OF THE INVENTION

In view of the aforementioned considerations, a fluid connection is provided having a plate with first and second sides. A plurality of first fluid connections are on the first side of the plate and are unitary with the plate. A plurality of second fluid connections are on the second side of the plate, the second fluid connections being unitary with the plate and at least one group of second fluid connections being connected to only one first fluid connection.

In a further aspect of the invention, the first fluid connections are tubes which have axes disposed in an angle to plane defined by the plate and the second fluid connections are tubular and extend substantially perpendicular to the plane defined by the plate. First bores extend co-axially with the axes of each of the first fluid connections. Each first bore connects with second bores in the second fluid connections, which second bores extend transverse to the axes of the first bores.

In still a further aspect of the invention, the fluid connections are pneumatic connections for connecting compressed air sources to pneumatic devices in a vehicle, wherein the air sources are on one side of a bulkhead or panel and the pneumatic devices are on the other side.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1A:
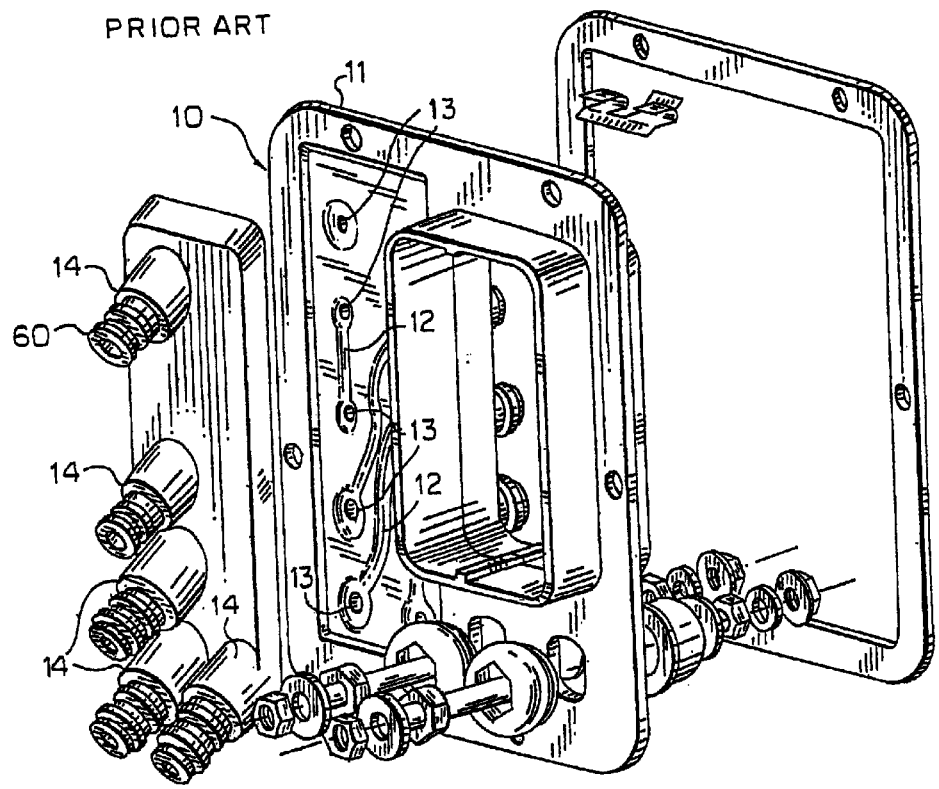
FIG. 1A is an exploded perspective view of a prior art bulkhead union over which the present invention is an improvement.
Figure 1B:
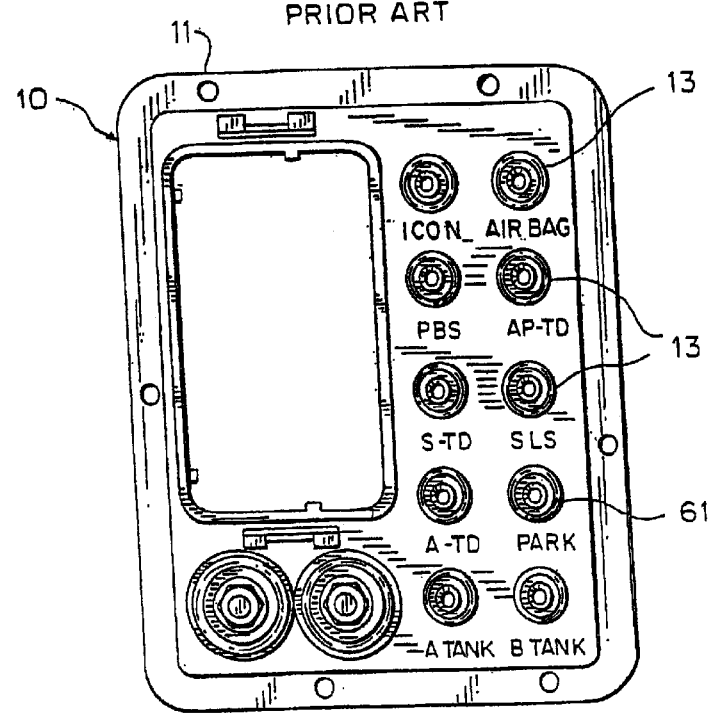
FIG. 1B is a rear view of the bulkhead union of FIG. 1A.
Figure 2:
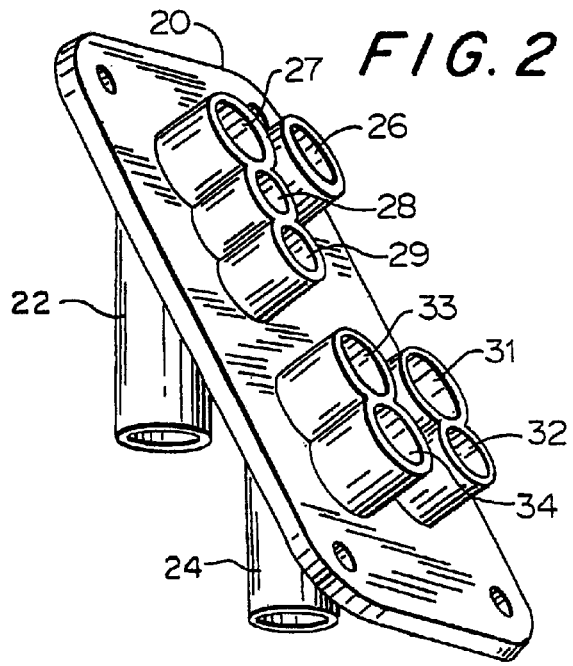
FIG. 2 is a perspective view of the rear side of a bulkhead union fluid connection according to the present invention.

Referring now to FIGS. 1A and 1B, there is shown multi-port bulkhead union 10 configured in accordance with the prior art wherein a base plate 11 has channels 12 therein which connect outlet ports 13 to one or more inlet ports 14. The device shown in FIGS. 1A and 1B is used to connect pneumatic pressure sources (not shown) via inlet ports 14 to pneumatic devices via outlet ports 13. Since some pneumatic devices have the same pressure requirements, two or more outlet ports 13 may be connected to a single inlet port 14. In that the prior art multi-port bulkhead union 10 requires two parts, it can be relatively expensive to manufacture and may have reliability considerations associated therewith.

Referring now to an embodiment of the claimed invention shown in FIGS. 2–7, a multi-port fluid connection is shown, wherein a plate 20 is configured to be bolted or otherwise attached to a panel or bulkhead by molding, screws or adhesive. The plate 20 has unitary therewith a plurality of first fluid connections in the form of inlet ports 21, 22, 23 and 24 which are connected with second fluid connections in the form of outlet ports 26; 27, 28, 29; 31, 32, and 33, 34, respectively. The inlet ports 21–24 and the outlet ports 26–32 are unitary with the bulkhead 20 forming a multi-flow connection as a single piece bulkhead union. As seen in the figures, the inlet ports 21–24 are each oriented at an angle Θ with respect to a plane 35 defined by the plate 20, while the outlet ports 26–32 extend perpendicular to the plane defined by the plate 20.

Figure 6:
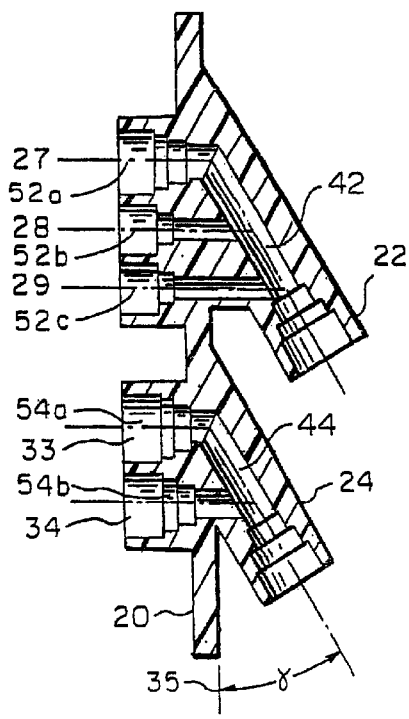
FIG. 6 is a side elevation taken along lines 6—6 of FIG. 5.
Figure 7:
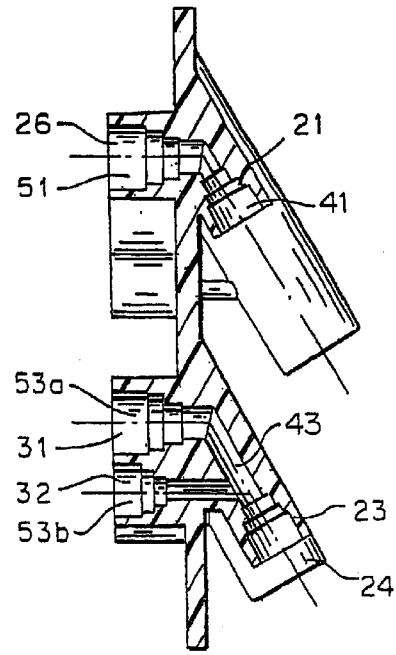
FIG. 7 is side elevation taken along lines 7—7 of FIG. 5.

As FIGS. 6 and 7 illustrate, the inlet ports 21–24 have stepped, axially extending bores 41–44, respectively. Stepped bores 41–44 extend preferably at angle α of about 30° with respect to the plane 35 of the plate 20, with an angle of 0–45° being an option.

The counter bores 41–44 of inlets 21–24 intersect second counter bores 51–54 in the outlet ports 26–32. Second counter bores 51–54 each extend perpendicular to the plane 35 of the plate 20. Each of the counter bores 31–44 and 51–54 receive pneumatic couplings such as quick connect couplings 60 and 61 (see FIGS. 1A, 1B, 8A and 8B).

Figure 3:
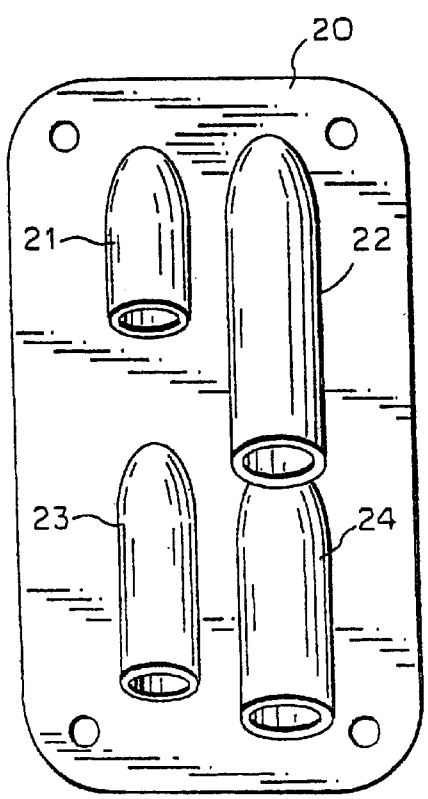
FIG. 3 is a planar view of the front side of the fluid connection of FIG. 2.
Figure 4:
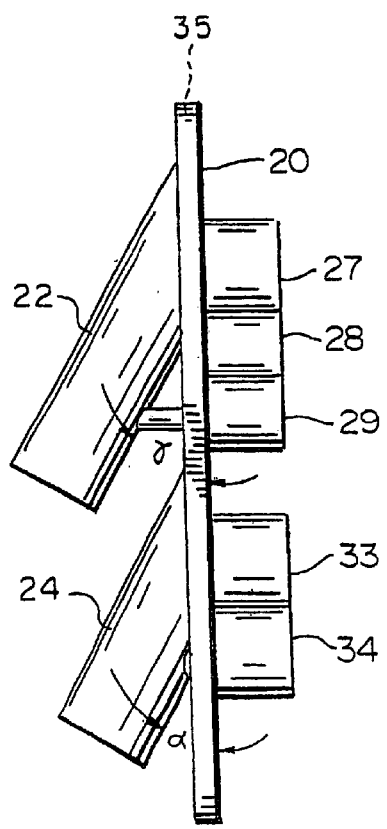
FIG. 4 is a side view of the fluid connection shown in FIGS. 2 and 3.
Figure 5:
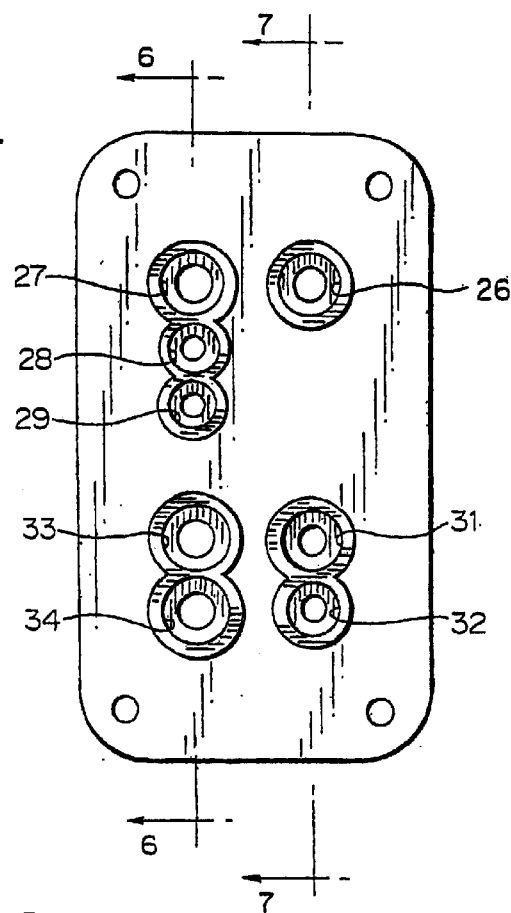
FIG. 5 is a rear view of the fluid connection shown in FIGS. 2–4.

Referring now to FIGS. 3, 5 and 7 where the inlet port 21 is shown connected to the outlet port 26, it is seen that only one outlet port 26 is connected by its stepped bore 51 with the inlet port via stepped bore 41. This is apparent in FIG. 7. The inlet port 21 and outlet port 26 are unitary i.e., a single piece, with a plate 20.

Referring now mainly to FIGS. 2, 3, 4, 5, and 6, it is seen that the inlet port 22 is connected to the three outlet ports 27, 28 and 29 by bores 52a, 52b and 52c which intersect the stepped bore 42. As is seen in FIG. 6, the inlet port 22 and the outlet ports 27–29 are unitary with the plate 20.

Referring now to mainly to FIGS. 3, 5 and 7, the inlet port 23 is connected to two outlet ports 31 and 32 via stepped bores 53a and 53b, respectively, which bores intersect the first stepped bore 43. Again the inlet ports are unitary with the plate 20.

Referring now to FIGS. 1, 3, 4, 5 and 6, it is seen that the inlet port 24 is connected to outlet ports 33 and 34 via stepped bores 54a and 54b which intersect the first stepped bore 44. Again, the inlet port 24 and the outlet ports 33 and 34 are integral with the plate 20.

While either one, two or three outlet ports are shown connected to a single inlet port in the illustrated embodiment, the concept is extendible to any number of fluid connections. And while the unitary multi-port bulkhead union is in one aspect injected molded from plastic, could also be die cast from metal.

Figure 8A:
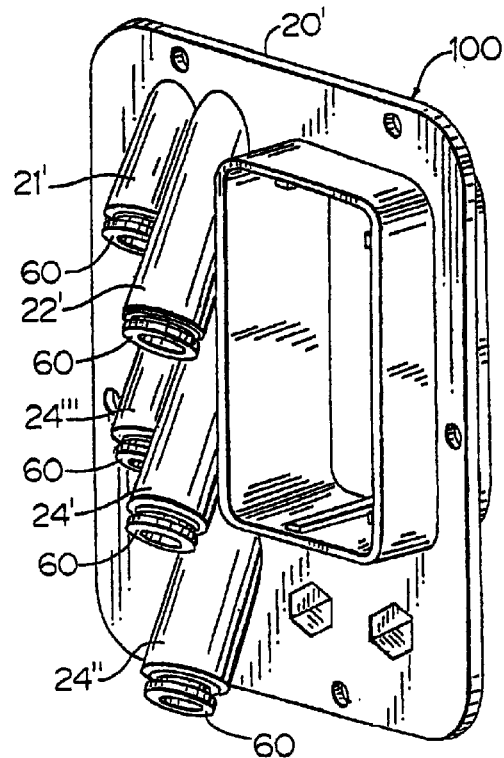
FIG. 8A is a front view of the invention of FIGS. 2–7 applied to the bulkhead union of FIGS. 1A and 1B.
Figure 8B:
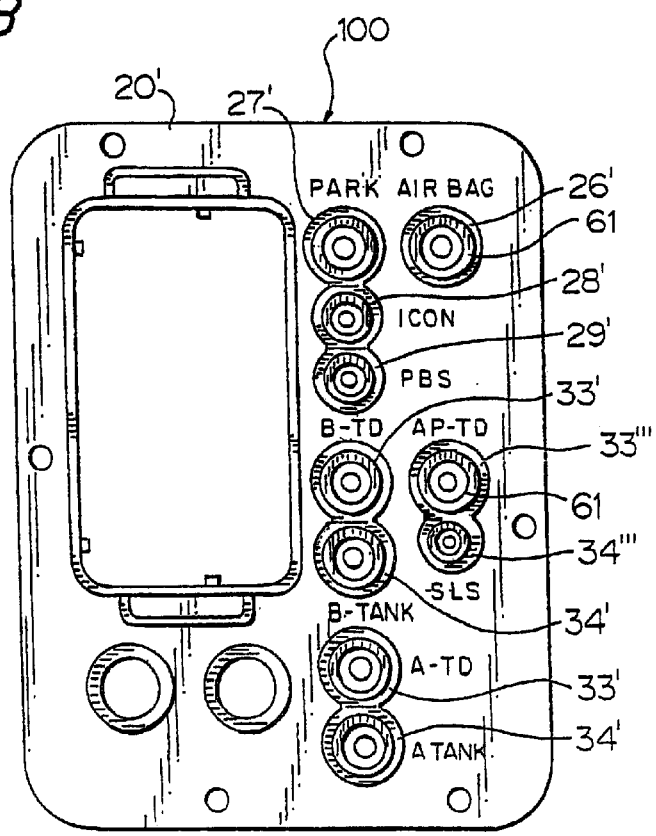
FIG. 8B is a back view of the invention of FIGS. 2–7 applied to the bulkhead union of FIGS. 1A and 1B.

FIGS. 8A and 8B illustrate a further embodiment of the present invention wherein the unitary multi-port arrangement of FIGS. 2–7 is used in configuring a bulkhead union 100 similar to that of FIGS. 1A and 1B.

While one use for the embodiment of the invention illustrated in FIGS. 2–8 is to transmit fluid pressure from a pressure source to pressure using devices, it is also within the preview of this invention to use the inlet and outlet ports to transmit fluid flows, whether those fluid flows are liquids such as hydraulic fluid or for gases wherein the gases, being transmitted are either the same or different. In addition, the bores of the illustrated connections may also be used to route electrical wires or cables. While fluid is applied so as to divide a fluid impact into two or more streams, the structure of this invention can also be used to add fluid inputs to one another by reviewing the inputs and outputs.

From the foregoing description, one skilled in the art can easily ascertain the essential characteristics of this invention, and without departing from the spirit and scope thereof, can make various changes and modifications of the invention to adapt it to various usages and conditions.

We claim:

1. A fluid connection, comprising:

a plate having a first side and a second side;

a plurality of inlet ports on the first side of the plate;

a plurality of outlet ports on the second side of the plate, wherein there is more than one outlet port in communication with each inlet port; and wherein a first bore extends coaxially with the axes of each of the inlet ports, and wherein the outlet ports are connected to the first bores by second bores which extend at an obtuse angle to the axes of the first bores, the first bores being on an opposite side of the plate relative to the second bores.

2. A fluid connection according to claim 1, wherein the outlet ports extend substantially perpendicular to the surface defined by the plate.

3. A fluid connection according to claim 1, wherein the fluid connection is unitary.

4. A fluid connection according to claim 3, wherein the fluid connection is formed from a single piece of material.

5. A fluid connection according to claim 4, wherein the fluid connection is made of plastic.

6. A fluid connection according to claim 4, wherein the fluid connection is made of metal.

7. A fluid connection according to claim 3, where the fluid connection is made of plastic.

8. A fluid connection according to claim 3, where the fluid collection is made of metal.

9. A fluid connection according to claim 1, wherein at least one of said inlet ports and said outlet ports is tubular.

* * * * *